US009627675B2

(12) United States Patent
Ogasawara et al.

(10) Patent No.: US 9,627,675 B2
(45) Date of Patent: Apr. 18, 2017

(54) BUS BAR MODULE AND POWER-SUPPLY UNIT

(75) Inventors: Shigeyuki Ogasawara, Makinohara (JP); Michio Ota, Makinohara (JP)

(73) Assignee: Yazaki Corporation, Tokyo (JP)

( * ) Notice: Subject to any disclaimer, the term of this patent is extended or adjusted under 35 U.S.C. 154(b) by 95 days.

(21) Appl. No.: 14/378,027

(22) PCT Filed: Feb. 21, 2012

(86) PCT No.: PCT/JP2012/054101
§ 371 (c)(1),
(2), (4) Date: Aug. 11, 2014

(87) PCT Pub. No.: WO2013/124966
PCT Pub. Date: Aug. 29, 2013

(65) Prior Publication Data
US 2015/0017516 A1    Jan. 15, 2015

(51) Int. Cl.
*H01M 2/20* (2006.01)
*H01M 2/10* (2006.01)
*H01M 2/34* (2006.01)

(52) U.S. Cl.
CPC .............. *H01M 2/206* (2013.01); *H01M 2/34* (2013.01); *H01M 2/1077* (2013.01); *H01M 2220/20* (2013.01)

(58) Field of Classification Search
CPC .................................................. H01M 2/0473
See application file for complete search history.

(56) References Cited

U.S. PATENT DOCUMENTS

| 4,098,963 | A | * | 7/1978 | Mocas | H01M 2/1217 |
| | | | | | 429/88 |
| 5,804,770 | A | | 9/1998 | Tanaka | |
| 8,492,024 | B2 | | 7/2013 | Ogasawara et al. | |
| 8,999,546 | B2 | | 4/2015 | Hostler et al. | |
| 9,166,211 | B2 | | 10/2015 | Ogasawara et al. | |
| 2010/0255351 | A1 | | 10/2010 | Ijaz et al. | |

FOREIGN PATENT DOCUMENTS

| CN | 101952924 A | 1/2011 |
| CN | 102024929 A | 4/2011 |
| JP | 2000-100417 A | 4/2000 |
| WO | WO-2011/142201 A1 | 11/2011 |

OTHER PUBLICATIONS

Office Action dated Dec. 18, 2015, issued for the Chinese patent application No. 201280070371.6 and English translation thereof.
Office Action mailed Jun. 24, 2014, issued for the Japanese patent application No. 2011-025903 and English translation thereof.
Supplementary European Search Report mailed Sep. 9, 2015, issued for the European patent application No. 12869386.8.
Office Action dated Nov. 11, 2016 issued for corresponding European Patent Application No. 12 869 386.8.

* cited by examiner

*Primary Examiner* — Sarah A Slifka
*Assistant Examiner* — Wojciech Haske
(74) *Attorney, Agent, or Firm* — Locke Lord LLP

(57) ABSTRACT

A power-supply unit and a bus bar module which can reduce die cost of an insulating cover are provided. Each of the two insulating covers is provided so as to cover both a first receiving portion and a second receiving portion. For this reason, the two insulating covers arranged on a plate and aligned in an overlapping direction of a battery can be formed in the same shape and same size.

5 Claims, 7 Drawing Sheets

BUS BAR MODULE AND POWER-SUPPLY UNIT

BACKGROUND OF THE INVENTION

The present invention relates to a bus bar module and a power-supply unit, in particular, a bus bar module for connecting a plurality of batteries in series and a power-supply unit having the bus bar module.

In an electric vehicle running by using an electric motor or hybrid vehicle running by combining an engine and the electric motor, a power-supply unit as a drive source is mounted. The power-supply unit has a battery assembly consists of a plurality of batteries. In one end of the battery, a positive electrode is provided, and in the other end thereof a negative electrode is provided. The batteries are connected in series so as to gain a desired voltage. Furthermore, those batteries are arranged in two rows along one direction so that the positive electrode and the negative electrode are positioned next to each other.

The above power-supply unit connects the positive and negative electrodes of each battery of the battery assembly with a connecting member, and thereby the batteries of the battery assembly are connected in series. As a result, it is required to assemble a plurality of connecting members in the battery assembly, and thereby assembly working of the power-supply unit becomes complex.

In order to solve the above problem, for example, as shown in FIG. 8, a bus bar module is suggested. The bus bar module is able to assemble a plurality of connecting members for connecting a plurality of batteries in series to the batter assembly by collecting the connecting members. This bus bar module 3 has a plurality of bas burs 9 as a connecting member for connecting the batteries of the battery assembly in series, a plate 10 to which the bas bars 9 are attached and fixed to the battery assembly, and a insulating cover 12.

The plurality of the bus bars 9 consist of metal having conductive property, are formed in a band-plate shape, and has a plurality of holes through which positive and negative electrodes pass.

The above plate 10 consists of synthetic resin, and has a plurality of first receiving portions 10a, a plurality of second receiving portions 10b, and a plate main body 10c. The first receiving portions 10a are formed in a box shape including a bottom surface, coupled each other, and receive the bus bars 9 connecting between the electrodes of one of two rows of the electrode. The second receiving portions 10b are formed in a box shape including a bottom surface, coupled each other, and receive the bus bars 9 connecting between the electrodes of the other thereof. The plate main body 10c couples the first receiving portions 10a and the second receiving portions 10b.

The insulating cover 12 has a first insulating cover 12a for covering an opening of the first receiving portion 10a and a second insulating cover 12b for covering an opening of the second receiving portion 10b. The first and second insulating covers 12a, 12b have respectively a plurality of engaging portions 12c engaging with an engaging projection (not shown) arranged in the plate 10 when they are overlapped on the plate 10 so as to keep it on the plate 10.

In this manner, by attaching the plate 10 in which the bus bars 9 are fixed to the battery assembly, the above bus bar module 3 is able to connect the batteries of the battery assembly in series by the bus bars 9. Also, thereby assembling work to the battery has been simplified.

SUMMARY OF THE INVENTION

In the above conventional power-supply unit, the first and second insulating covers 12a, 12b are separately arranged in the first and second receiving portions 10a, 10b. Furthermore, in the first insulating cover 12a, a portion for covering a terminal portion of the electric wire connected to one end of the battery assembly is arranged, and in the second insulating cover 12b, a portion for covering a terminal portion of the electric wire connected to the other end thereof. As a result, the first insulating cover 12a differs from the second insulating cover 12b in shape, and thereby two dies are required.

Furthermore, since the first and second insulating covers 12a, 12b increase in length of overlapping direction X of the battery, big dies are required. Additionally, as shown in FIG. 9, a hinge 12d for absorbing tolerance in an overlapping direction X of the battery is required, and thereby the die becomes complex. As a result, cost is increased.

Accordingly, the present invention is to provide a power-supply unit and a bus bar module which can reduce cost of a die of an insulating cover and a bus bar module.

In order to attain the above object, a first aspect of the present invention provides a bus bar module comprising: a plurality of bus bars attached between electrodes of a plurality of batteries which are overlapped so that the electrodes are arranged in two rows, connecting between the electrodes, and thereby connecting the plurality of the batteries in series; and a plate having a plurality of first receiving portions coupled each other and respectively receiving the bus bars connecting between the electrodes of one of the two rows, a plurality of second receiving portions coupled each other and respectively receiving the bus bars connecting between the electrodes of the other thereof, and a plate main body coupling the first and second receiving portions each other, wherein a plurality of insulating covers formed in the same shape and size is arranged in a line on the plate along an overlapping direction of the battery, each the insulating cover being provided so as to cover both the first and second receiving portions.

In a second aspect of the present invention, the two insulating covers are arranged next to each other, each of the two insulating covers being provided with a pair of positioning holes aligned in the overlapping direction, wherein the plate is provided with a pair of positioning bosses arranged in the center of the plate and aligned along the overlapping direction, and wherein in a first insulating cover of the two insulating covers, the positioning boss is inserted into only one of the pair of the positioning holes in the overlapping direction, and in a second insulating cover of the two insulating covers, the positioning boss is inserted into only the other of the pair of the positioning holes in the overlapping direction.

In a third aspect of the present invention, the plate is provided with a protruding portion projecting toward the insulating cover, and an engaging claw projecting from a tip of the protruding portion in a direction perpendicular to the overlapping direction, and wherein the insulating cover is provided with an engaging hole in which the engaging claw is inserted, the length of the engaging hole being longer than the length of the engaging claw in the overlapping direction.

A fourth aspect of the present invention provides a power-supply unit comprising: a battery assembly constructed of a plurality of batteries which are overlapped so that electrodes are arranged in two rows; a plurality of bus bars attached between the electrodes of the battery next to each other, connecting between the electrodes, and thereby connecting the plurality of the batteries in series; and a plate having a plurality of tubular first receiving portions coupled each other and respectively receiving the bus bars connecting between the electrodes of one of the two rows, a plurality of tubular second receiving portions jointed each other and respectively receiving the bus bars connecting between the electrodes of the other thereof, and a plate main body coupling the first and second receiving portions each other, wherein a plurality of insulating covers formed in the same shape and size is arranged on the plate in a line along an overlapping direction of the battery, each the insulating cover being provided so as to cover openings of both the first and second receiving portions.

As explained above, according to the first and fourth aspect of the present invention, since each of the plurality of the insulating covers is provided so as to cover both the first and second receiving portions, the plurality of the insulating covers arranged on the plate along the overlapping direction of the battery can be formed in the same shape and same size. Therefore, the plurality of the insulating covers can be formed with one die, and thereby die cost of the insulating cover can be reduced.

Furthermore, according to the second aspect of the present invention, even if a position of the positioning boss is not able to be arranged in the same position as the insulating cover, the plurality of the insulating covers can be formed with one die by arranging two positioning holes in each the insulating cover.

Furthermore, according to the third aspect of the present invention, the engaging hole engaging with the engaging claw, the length of the engaging hole being longer than the length of the engaging claw in the overlapping direction, are arranged. For this reason, even if a position of the protruding portion of the plate in the overlapping direction is misaligned, the engaging claw can be engaged with the engaging hole, and tolerance of the protruding portion in the overlapping direction can be easily absorbed.

DESCRIPTION OF THE PREFERRED EMBODIMENT

A bus bar module and a power-supply unit according to an embodiment of the present invention will be explained with reference to FIGS. 1 to 7. The power-supply unit 1 according to the embodiment of the present invention is mounted on an electric vehicle running with drive power of an electric motor or hybrid vehicle running with drive power both of an engine and the electric motor, and provides power to the motor.

Figure 2:
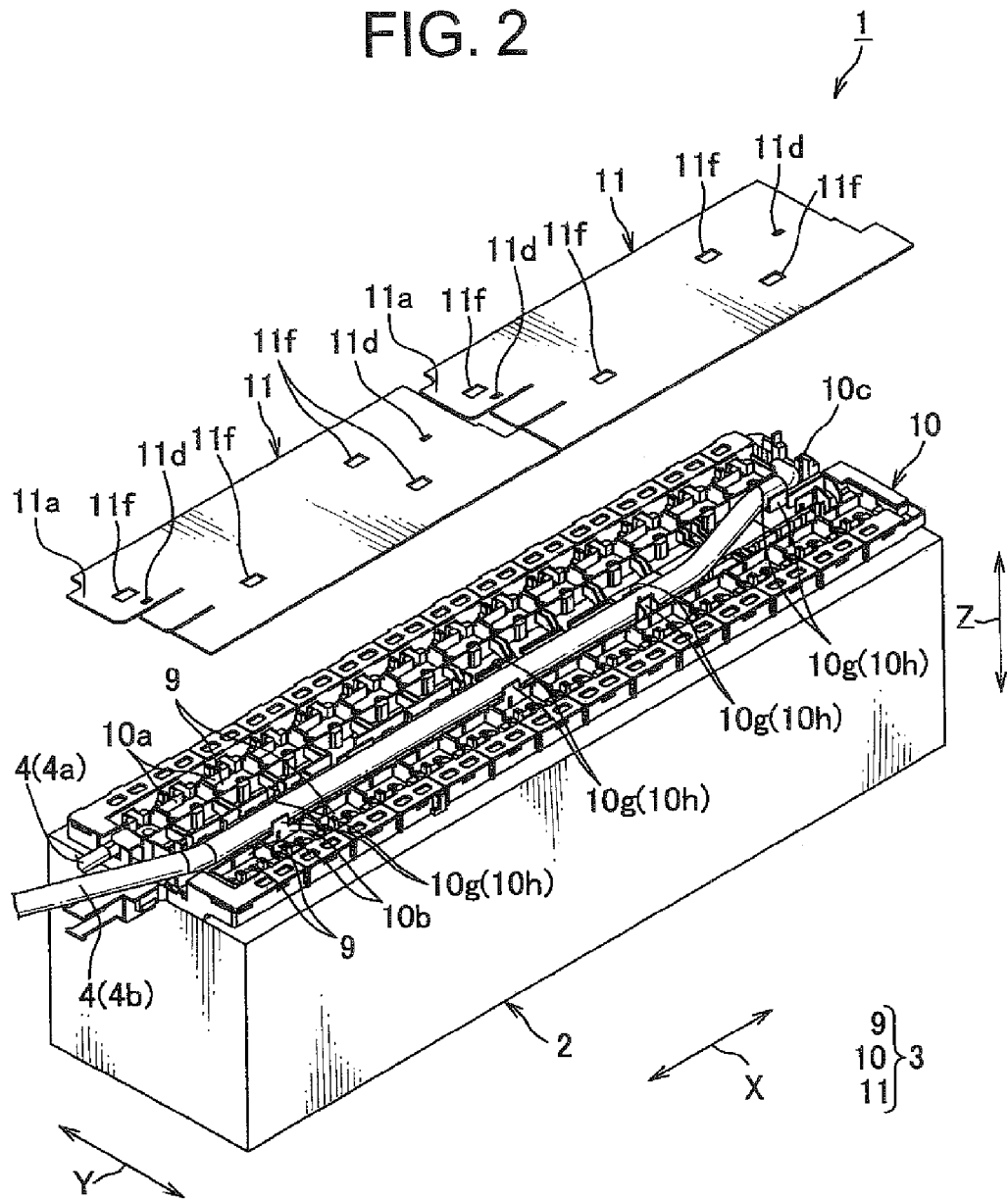
FIG. 2 is an exploded perspective view of a power-supply unit having the bus bar shown in FIG. 1.
Figure 3:
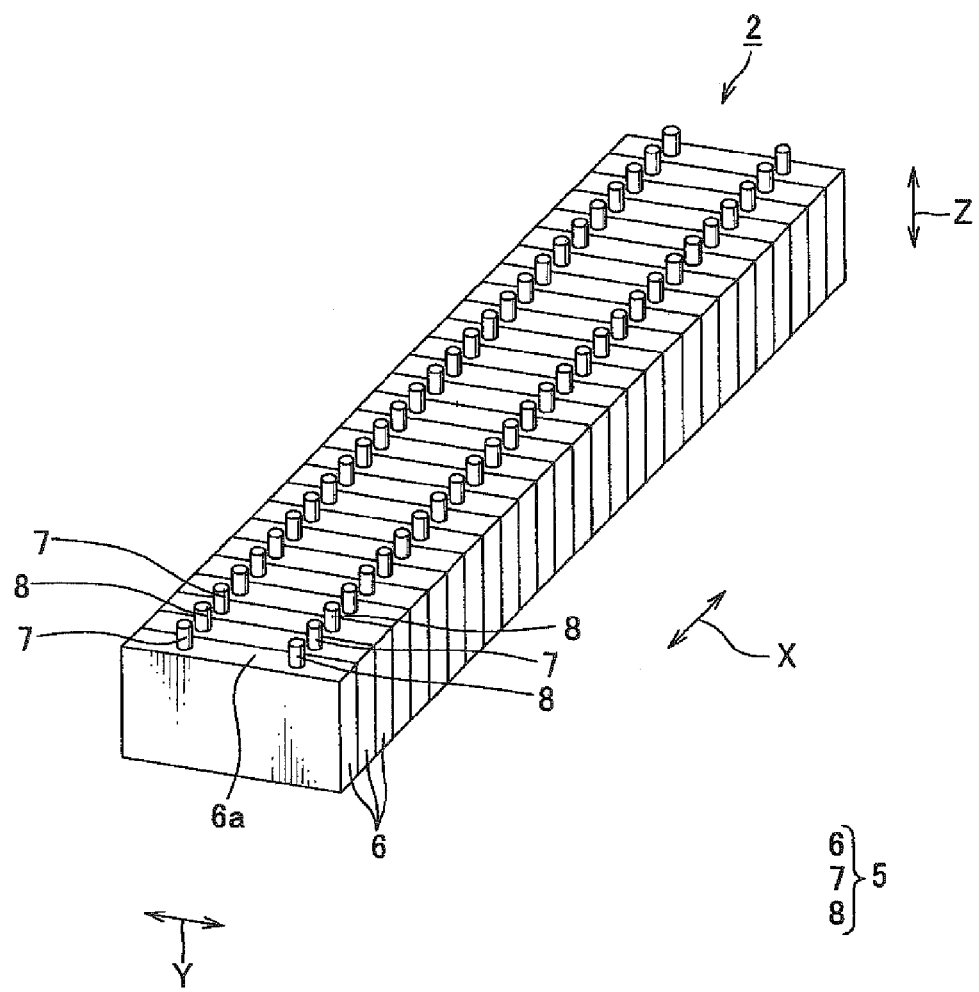
FIG. 3 is a perspective view of a battery assembly constructing the power-supply unit shown in FIG. 2.

As shown in FIGS. 2 and 3, the power-supply unit 1 of the present invention has a battery assembly 2 consisting of a plurality of batteries 5, a bus bar module 3 attached to the battery assembly 2, and a pair of electric wires 4.

As shown in FIG. 3, the batteries 5 have respectively a cube-shaped battery main body 6, a positive electrode 7, and a negative electrode 8. The positive electrode 7 is arranged in one end of the battery main body 6, and the negative electrode 8 is arranged in the other end thereof. The positive and negative electrodes 7, 8 are made of conductive metal, and formed in a cylinder shape. Furthermore, the positive and negative electrodes 7, 8 project from an upper surface 6a of the battery main body 6 in the same direction, and are located parallel to each other.

The above batteries 5 are located along one direction (an arrow X in FIG. 3) such that the positive and negative electrodes 7, 8 of neighboring batteries 5 are arranged next to each other in a state in which the upper surface 6a of the batteries 5 are positioned in the same plane each other. That is, the plurality of the batteries 5 are overlapped so that the positive and negative electrode 7, 8 are oppositely positioned each other.

The arrow X in FIGs indicates an overlapping direction of the batteries 5 and a longitudinal direction of the battery assembly 2, the arrow Y indicates a width direction of the battery assembly 2, and the arrow Z indicates a height direction of the battery assembly 2.

Figure 7:
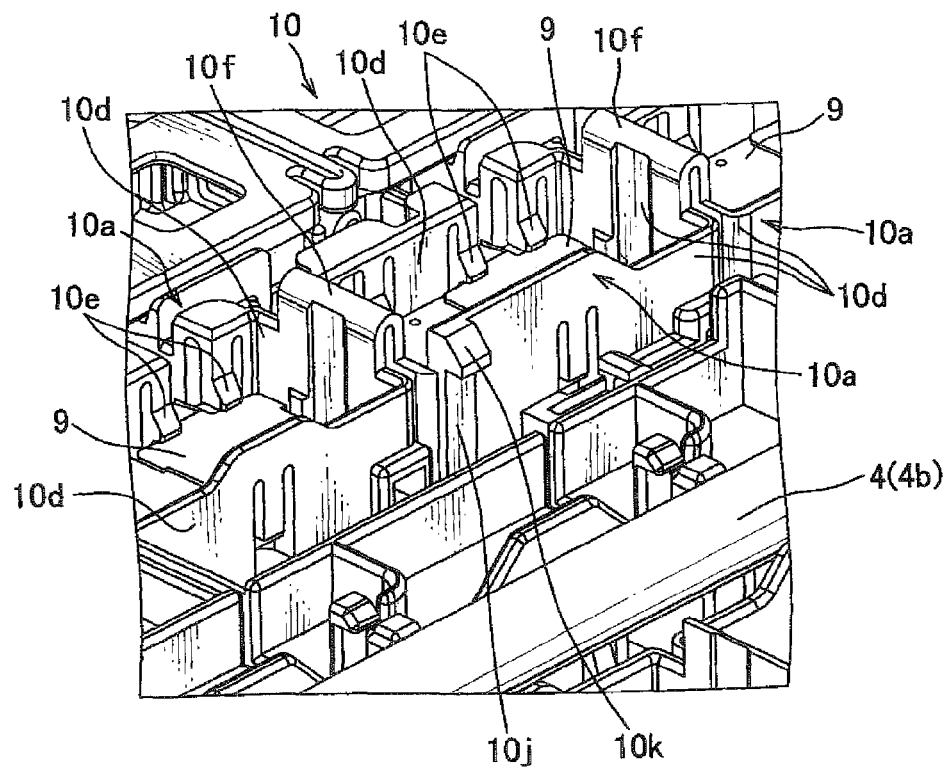
FIG. 7 is a partly perspective view of a plate in the power-supply unit shown in FIG. 2.
Figure 8:
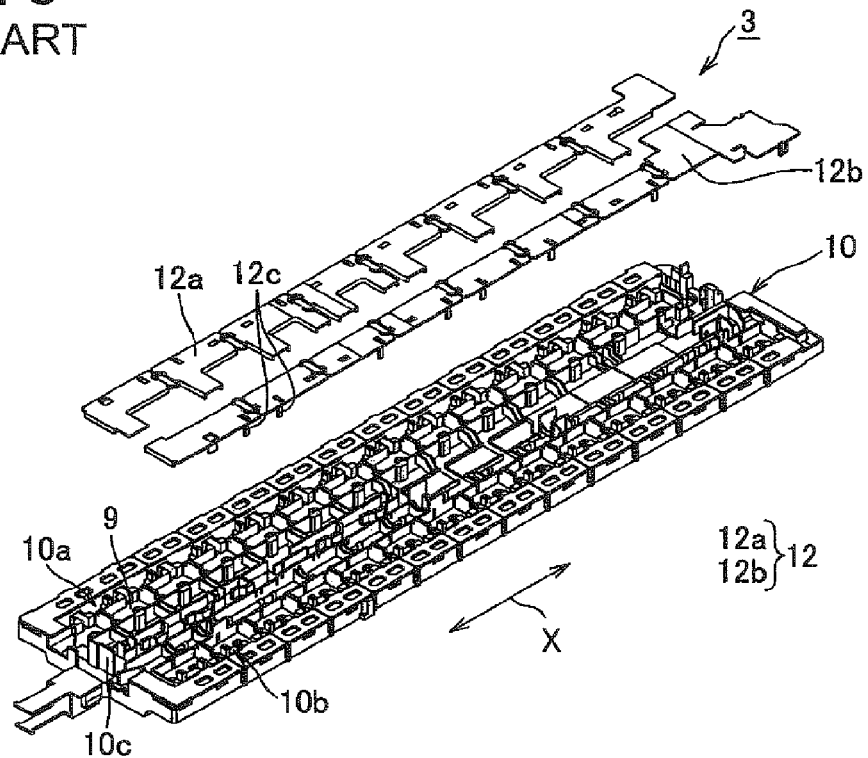
FIG. 8 is an exploded perspective view showing one example of a bus bar module constructing a conventional power-supply unit.
Figure 9A:
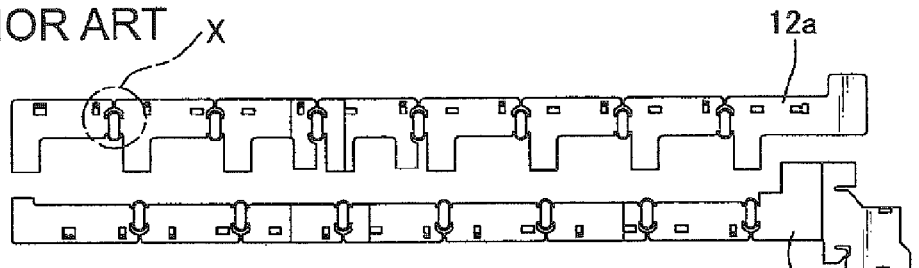
FIG. 9A is a top view of an insulating cover constructing the bus bar module shown in FIG. 8.
Figure 9B:
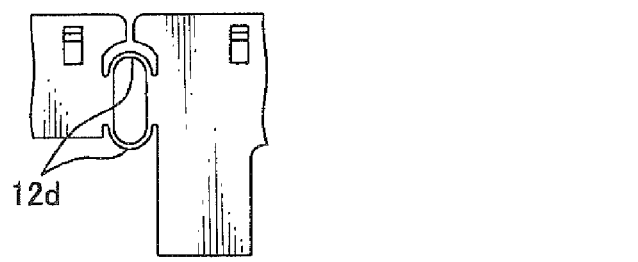
FIG. 9B is an enlarged view of X point of FIG. 9A.

The above bus bar module 3 connects the above batteries 5 in series, and as shown in FIGS. 2 and 7 has a plurality of bus bars 9 connecting the batteries 5 in series, a plastic plate 10 receiving them, and two insulating covers 11 overlapped on the plate 10.

The bus bar 9 is formed by press working a conductive metal plate, and has a pair of holes on the metal plate. The positive and negative electrodes 7, 8 adjacent to each other of each battery 5 pass through the holes. Furthermore, the positive and negative electrodes 7, 8 passing through each the hole are screwed into a nut (not shown), and thereby the bus bar 9 is fixed.

The above plate 10 is made of synthetic resin of insulation. As shown in FIG. 2, the planer shape of the plate 10 is a box, and the length of the plate 10 in the longitudinal direction is approximately equal to the length of the battery assembly 2 in the direction X. Furthermore, the plate 10 has a plurality of base-capped tubular first receiving portions 10a coupled each other, a plurality of base-capped tubular second receiving portions 10b coupled each other, and a plate main body 10c connecting the first receiving portions 10a and the second receiving portions 10b each other. The first receiving portions 10a receive the bus bar 9 connecting between the positive electrode 7 and the negative electrode 8 of one of two rows of the positive and negative electrodes 7, 8, and the second receiving portions 10b receives the bus bar 9 connecting between the positive electrode 7 and the negative electrode 8 of the other thereof.

As shown in FIG. 7, the first receiving portions 10a and the second receiving portions 10b are respectively a bottom wall (not shown) on which the bus bar 9 is mounted and a peripheral wall 10d vertically arranged from the bottom wall along an periphery of the bus bar 9. Furthermore, the first receiving portions 10a and the second receiving portions 10b are formed in a base-capped tubular shape so that an opening is arranged in a side away from the battery assembly 2. In the above first and second receiving portions 10a, 10b, a pair of through-holes (not shown) is respectively arranged. The through-holes are overlapped on the pair of the holes of the bus bar 9. The positive and negative electrodes 7, 8 of each battery 5 inserted into each through-hole are respectively passed through the holes of the bus bar 9.

Also, in the peripheral wall 10d of the first and second receiving portions 10a, 10b, an engaging projection 10e is arranged, and the bus bar 9 is engaged with the engaging projection 10e. The positive and negative electrodes 7, 8 passed through the bus bar 9 and the through-hole of the bus bar 9 are exposed from the openings of the first and second receiving portions 10a, 10b. By screwing a nut (not shown) in the positive and negative electrodes 7, 8 from the openings, the plate 10 is able to be fixed in the battery 5.

The plurality of the first and second receiving portions 10a, 10b are coupled by each of a hinge part, and positioned along the overlapping direction X of the battery 5. Furthermore, the plurality of the first and second receiving portions 10a, 10b are spaced in the direction Y each other.

As shown in FIG. 2, the plate main body 10c is formed in a plate shape so that the first and second receiving portions 10a, 10b are coupled each other. A polarity of electric wire holding portions 10g is arranged between the first and second receiving portions 10a, 10b of the plate main body 10c. The electric wire holding portions 10g are spaced in the overlapping direction X each other, and have a pair of fixing pieces 10h, respectively. The fixing pieces are located in pairs so that one electric wire 4b of the pair of the electric wires 4 is arranged in the center, and support the one electric wire 4b by sandwiching it.

The two insulating covers 11 are made of insulating synthetic resin, formed in the same shape and size, and located on the plate 10 along in the overlapping direction X of the battery 5. Furthermore, the general planar shape of each the insulating cover 11 is formed in a rectangular shape, the length of the insulating cover 11 in the longitudinal direction is formed in a length equal to half of the battery assembly 2 in the overlapping direction X of the battery assembly 2, and the length in the width direction is formed in a length equal to the length of the battery assembly 2 in the direction Y.

Figure 1:
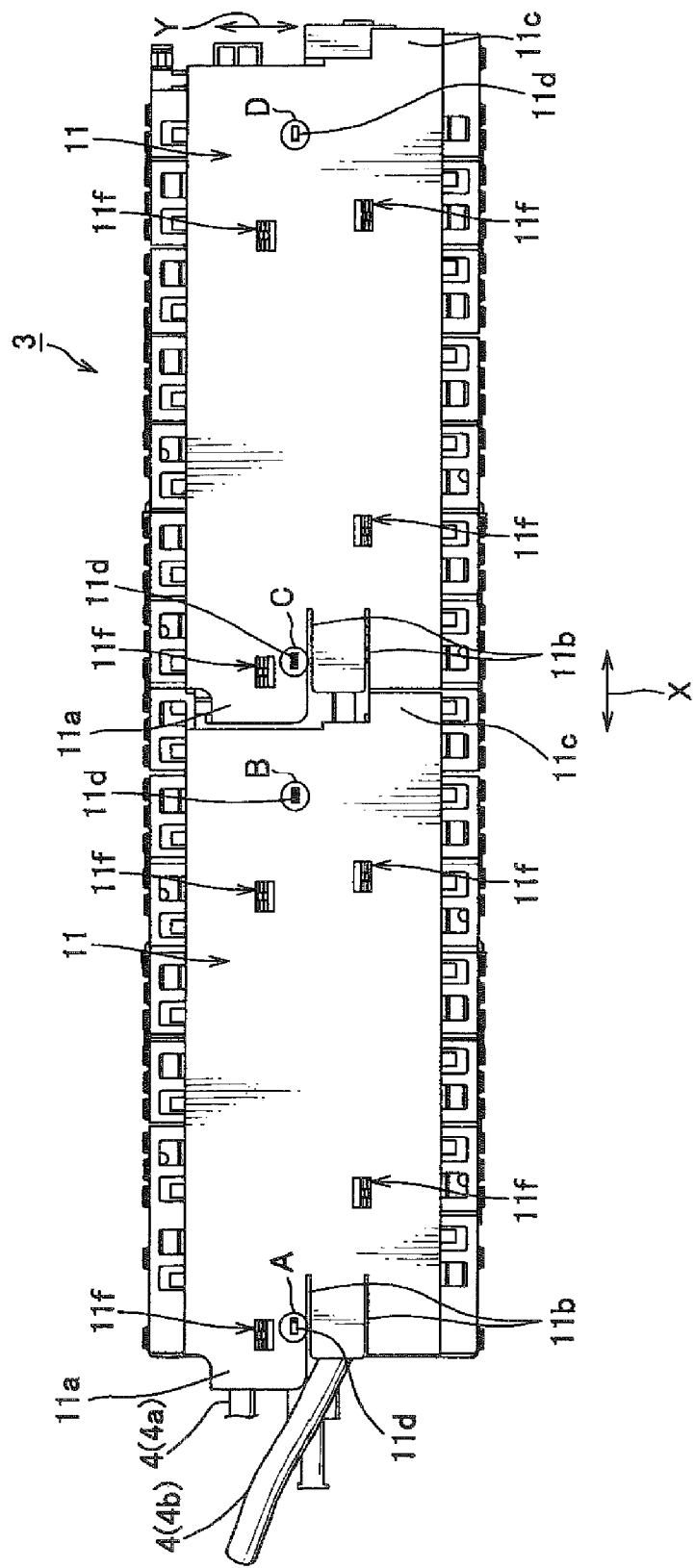
FIG. 1 is a top view showing an embodiment of a bus bar module of the present invention.

Namely, as shown in FIGS. 1 and 2, one (left side in FIG. 1) of the two insulating covers 11 in the overlapping direction X covers the openings of one (left side) of both the first and second receiving portions 10a, 10b in the overlapping direction X. Furthermore, the other (right side in FIG. 1) of the two insulating covers 11 in the overlapping direction X covers the openings of the other (right side) of both the first and second receiving portions 10a, 10b in the overlapping direction X.

A projection 11a projecting outward in the overlapping direction X is arranged in the one side (left side in FIG. 1) of the insulating cover 11 of the overlapping direction X and in the one side (upper side in FIG. 1) of the direction Y. The electric wire 4a is guided from under the projection 11a of the insulating cover 11 arranged on the one side of the two insulating covers 11. Furthermore, a pair of slits 11b is arranged on the bottom side of the projection 11a in FIG. 1, spaced in the direction Y, and located along the overlapping direction X.

As a result, the insulating cover 11 between the pair of the slits 11b is flexibly arranged in the direction Z, and the electric wire 4b is guided from under it. In addition, a projection 11c projecting outward in the overlapping direction X is arranged in the other side (right side in FIG. 1) of the insulating cover 11 and one side (bottom side in FIG. 1) of the direction Y. As shown in FIG. 1, the height of the projection 11a is approximately equal to the height of the projection 11c.

Figure 6:
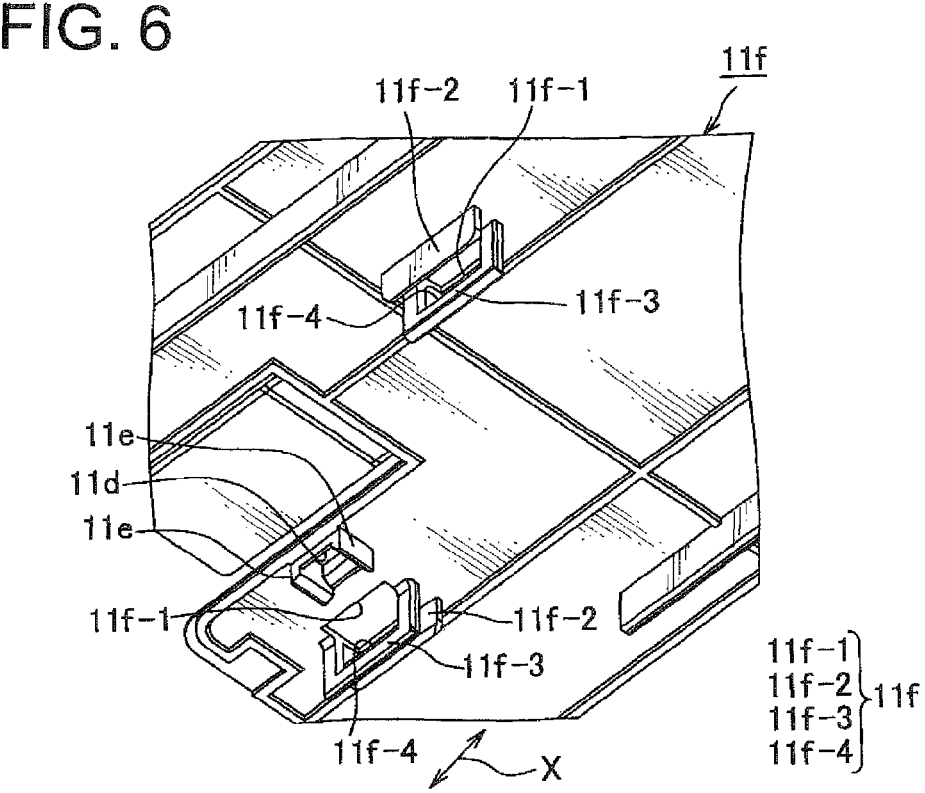
FIG. 6 is a partly perspective view of a back side of an insulating cover in the power-supply unit shown in FIG. 2.

Further, a pair of positioning holes 11d is arranged at both ends of each the two insulating covers 11 in the overlapping direction X. The pair of the positioning holes 11d is formed in a long-rectangular shape, and located along the overlapping direction X each other. Moreover, as shown in FIG. 6, a pair of standing walls 11e is arranged on the positioning hole 11d, and vertically extends from the edge of the positioning hole 11d toward the plate 10. In an inner wall of the tip side of the standing wall 11e, a taper approaching each other with increasing distance from the tip thereof is arranged.

On the other hand, in the above plate 10, a pair of positioning bosses 10i (see FIGS. 4B and 4C) is arranged in the center portion along the overlapping direction X, and projects toward the insulating cover. The positioning bosses 10i are fitted into the positioning holes 11d arranged in the insulating cover 11. Furthermore, in a pair of outer walls opposed to the pair of the positioning bosses 10i in the overlapping direction X, a taper approaching each other toward the insulating cover 11 is arranged. As described above, by respectively arranging the tapers on the pair of the standing walls 11e and the positioning boss 10i, the positioning boss 10i can be easily fitted to the positioning hole 11d.

Figure 4A:
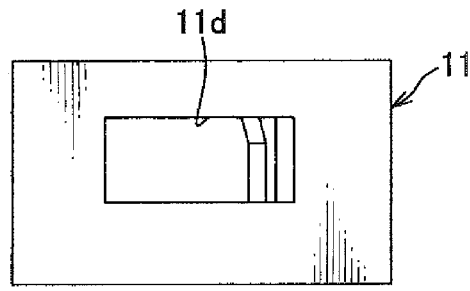
FIG. 4A is an enlarged view of A point of FIG. 1.
Figure 4B:
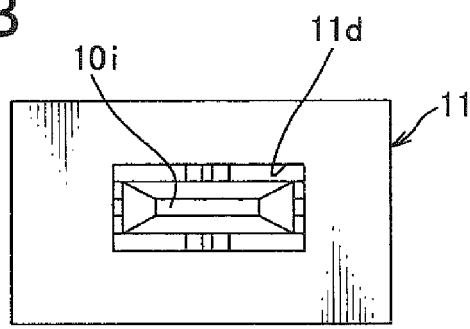
FIG. 4B is an enlarged view of B point of FIG. 1.

Furthermore, in one of the two insulating covers 11 (left side in FIG. 1), as shown in FIG. 4B, the positioning boss 10i is fitted into only one of the pair of positioning holes 11d at one side (right side in FIG. 1) in the overlapping direction X, and, as shown in FIG. 4A, the positioning boss 10i is not fitted into the other thereof at the other side (left side in FIG. 1) in the overlapping direction X.

Figure 4C:
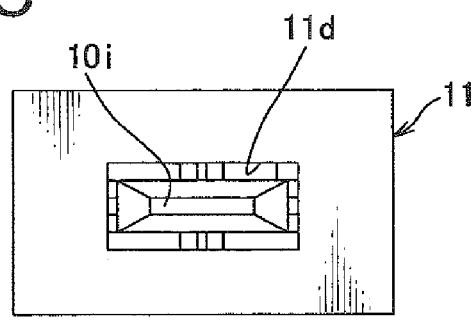
FIG. 4C is an enlarged view of C point of FIG. 1.
Figure 4D:
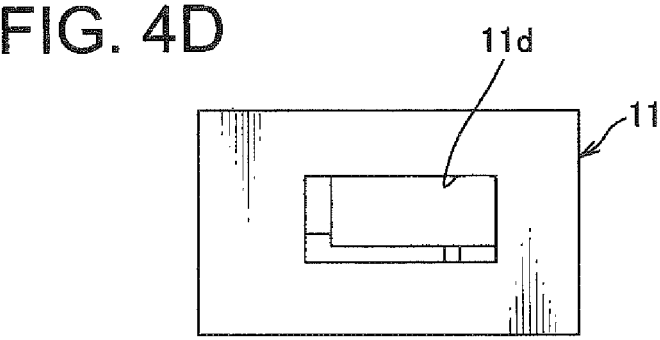
FIG. 4D is an enlarged view of D point of FIG. 1.

On the other hand, in the other of the two insulating covers 11 (right side in FIG. 1), as shown in FIG. 4C, the positioning boss 10i is fitted into only one of the pair of the positioning holes 11d at the other side (left side in FIG. 1) in the overlapping direction X, and, as shown in FIG. 4D, the positioning boss 10i is not fitted into the one thereof at the other side (right side in FIG. 1) in the overlapping direction X.

Figure 5A:
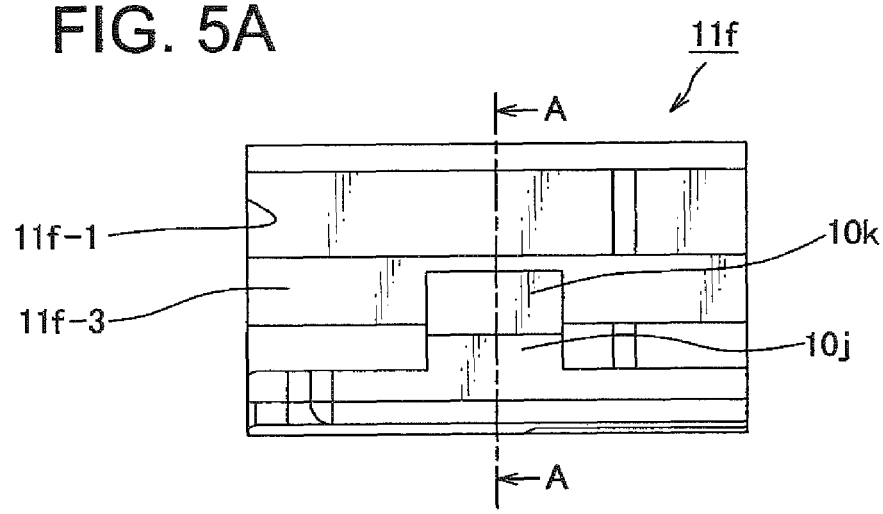
FIG. 5A is an enlarged view of 11f of FIG. 1.
Figure 5B:
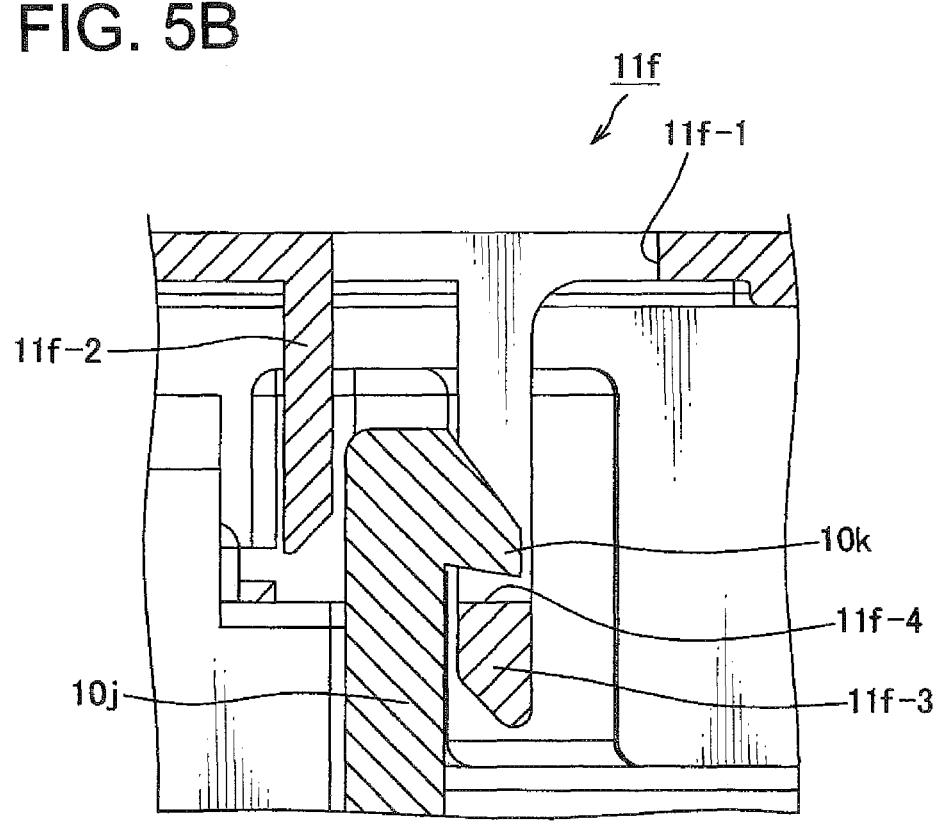
FIG. 5B is a cross-sectional view taken along the line A-A in FIG. 5A.

Also, the insulating cover 11 is provided with four engaging portions. As shown in FIGS. 5 and 6, the engaging portion 11f has a hole 11f-1, a first standing wall 11f-2, and a second standing wall 11f-3. The hole 11f-1 is formed in a rectangular shape. The first standing wall 11f-2 projects from the edge of the hole 11f-1 in the overlapping direction X. The second standing wall 11f-3 extends from the center of the hole 11f-1 in the direction Y parallel to the first standing wall 11f-2.

In the second standing wall 11f-3, a rectangular engaging hole 11f-4 is arranged, and the width thereof is the same width as the hole 11f-1. Furthermore, a taper approaching each other with increasing distance from the tip thereof is arranged in the tip end of the first and second standing walls 11f-2, 11f-3.

Also, as shown in FIGS. 5 and 7, a protruding portion 10j protruding toward the insulating cover 11 and an engaging claw 10k protruding from the tip end of the protruding portion 10j toward a direction (namely, the direction Y) perpendicular to the overlapping direction X are arranged in the plate 10. The engaging claw 10k is inserted into the engaging hole 11f-4 of the insulating cover 11, and thereby the engaging claw 10k is engaged with the second standing wall 11f-3. In addition, the engaging hole 11f-4 is formed in a shape longer than the engaging claw 10k in the overlapping direction X. More specifically, the width of the engaging hole 11*f*-4 in the overlapping direction X is more than three times the width of the engaging claw 10*k* in the overlapping direction X.

Next, an assembling method of the above power-supply unit 1 will be explained. First, the positive and negative electrodes 7, 8 of the battery 5 are inserted into the hole of the bus bar 9 held in the plate 10. Thereafter, the positive and negative electrodes 7, 8 are screwed into a nut, and thereby the plate 10 is attached to the battery assembly 2. Then, the pair of the positioning bosses 10*i* are inserted into the positioning holes 11*d* of the insulating cover 11.

Thereafter, the protruding portion 10*j* arranged in the plate 10 is inserted between the first standing wall 11*f*-2 arranged in the insulating cover 11 and the second standing wall 11*f*-3 arranged in the insulating cover 11. At this time, the second standing wall 11*f*-3 is bent in a side away from the first standing wall 11*f*-2 by the engaging claw 10*k*. Furthermore, when the engaging claw 10*k* is inserted into the engaging hole 11*f*-4 after inserting the protruding portion 10*j*, the second standing wall 11*f*-3 returns to the original shape, and the engaging claw 10*k* and the inner wall of the second standing wall 11*f*-3 are engaged. As a result, the insulating cover 11 is fitted to the plate 10.

According to the above bus bar module 3, since each of the two insulating covers 11 is provided so as to cover both the first receiving portion 10*a* and the second receiving portion 10*b*, the two insulating covers 11 arranged on the plate 10 along the overlapping direction X can be formed in the same shape and size. Thus, two insulating covers 11 can be formed with one die, and thereby die cost of the insulating cover 11 can be reduced.

Additionally, according to the bus bar module 3, the pair of the positioning holes 11*d* aligned in the overlapping direction X are arranged in each of the two insulating cover 11, and the pair of the positioning bosses 10*i* aligned along the overlapping direction are arranged in the center of the plate 10. In one of the two insulating covers 11, the positioning boss 10*i* is inserted into the one of the pair of the positioning holes 11*d* in the overlapping direction X. On the other hand, in the other of the two insulating covers 11, the positioning boss 10*i* is inserted into the other of the pair of positioning holes 11*d* in the overlapping direction X. That is, in the other of the two insulating covers 11, the positioning boss 10*i* is inserted into the positioning hole 11*d* different from the positioning hole 11*d* in which the positioning boss 10*i* is inserted in the one of the two insulating cover 11. Therefore, even if the positioning boss 10*i* is not arranged in the same position against each of the insulating covers 11, the two positioning holes 11*d* is arranged in each of the insulating covers 11. For this reason, a plurality of insulating covers can be provided with one die.

Moreover, according to the bus bar module 3, the engaging hole 11*f*-4 is arranged in the insulating cover 11, the engaging hole being formed in a rectangular shape longer than the engaging claw 10*k* in the overlapping direction X. Thus, even if a position of the protruding portion 10*j* of the plate 10 in the overlapping direction X is misaligned, the engaging claw 10*k* can be engaged with the engaging hole 11*f*-4, and tolerance of the protruding portion 10*j* in the overlapping direction X can be easily absorbed.

Also, according to the above power-supply unit 1 and the bus bar module 3, the plate 10 is covered with the two insulating covers 11, but the present invention is not limited thereto. A plurality of the insulating covers 11 should be arranged, for example, more than three insulating covers 11 may be arranged.

Furthermore, according to the above power-supply unit 1 and the bus bar module 3, the positioning boss 10*i* arranged in the plate 10 is fitted into only one of the pair of the positioning holes 11*d* in the insulating cover 11, but the present invention is not limited thereto. For example, the positioning boss 10*i* may be fitted into both the pair of positioning holes 11*d*.

In addition, according to the above power-supply unit 1 and the bus bar module 3, the engaging hole 11*f*-4 is arranged in the second standing wall 11*f*-3 vertically extending from the insulating cover 11, but the present invention is not limited thereto. For example, the engaging hole may be arranged in the main body of the insulating cover 11.

While the exemplary embodiments of the present invention have been described by way of example, it will be appreciated by those skilled in the art may make various modifications in the light of the above teaching and within the scope and sprit of the present invention, and the scope of the invention is to be defined by the claims appended hereto.

What is claimed is:

1. A bus bar module comprising:
    a plurality of bus bars attached between electrodes of a plurality of batteries which are stacked so that the electrodes are arranged in two rows, connecting between the electrodes, and thereby connecting the plurality of the batteries in series;
    a plate having a plurality of first receiving portions coupled with each other and respectively receiving the bus bars connecting between the electrodes of one of the two rows, a plurality of second receiving portions coupled with each other and respectively receiving the bus bars connecting between the electrodes of the other thereof, and a plate main body coupling the first and second receiving portions; and
    a plurality of insulating covers all formed in the same shape and size and arranged in the same direction in a line on the plate along a stacking direction X of the batteries,
    wherein each of the insulating covers covering both the first and second receiving portions,
    wherein each of the insulating covers has a first projection projecting in the stacking direction X of the battery at one side of the stacking direction X of the batteries and one side of a width direction Y of the batteries, and
    wherein each of the insulating covers has a second projection projecting in the stacking direction X of the batteries at the other side of the stacking direction X of the batteries and the other side of the width direction Y of the batteries.

2. The bus bar module as claimed in claim 1, wherein two insulating covers are arranged next to each other, each of the two insulating covers being provided with a pair of positioning holes aligned in the stacking direction,
    wherein the plate is provided with a pair of positioning bosses arranged in the center of the plate and aligned along the stacking direction,
    wherein one of the pair of the positioning bosses is inserted into one of the positioning holes in a first insulating cover of the two insulating covers, said one positioning hole of the first insulating cover being adjacent to a positioning hole in a second insulating cover of the two insulating covers, and
    wherein the other of the pair of the positioning bosses is inserted into one of the positioning holes in the second insulating cover, said one of the positioning holes of the second insulating cover being adjacent to the positioning hole of the first insulating cover.

3. The bus bar module as claimed in claim 2,
wherein the plate is provided with a protruding portion projecting toward the insulating cover, and an engaging claw projecting from a tip of the protruding portion in a direction perpendicular to the stacking direction, and
wherein the insulating cover is provided with an engaging hole in which the engaging claw is inserted, the length of the engaging hole being longer than the length of the engaging claw in the stacking direction.

4. The bus bar module as claimed in claim 1, wherein the plate is provided with a protruding portion projecting toward the insulating cover; and an engaging claw projecting from a tip of the protruding portion in a direction perpendicular to the stacking-direction, and
wherein the insulating cover is provided with an engaging hole in which the engaging claw is inserted, the length of the engaging hole being longer than the length of the engaging claw in the stacking direction.

5. A power-supply unit comprising:
a battery assembly constructed of a plurality of batteries which are stacked so that electrodes are arranged in two rows;
a plurality of bus bars attached between the electrodes of the battery next to each other, connecting between the electrodes, and thereby connecting the plurality of the batteries in series; and
a plate having a plurality of first tubular receiving portions coupled with each other and respectively receiving the bus bars connecting between the electrodes of one of the two rows, a plurality of second tubular receiving portions jointed with each other and respectively receiving the bus bars connecting between the electrodes of the other thereof, and a plate main body coupling the first and second receiving portions with each other; and
a plurality of insulating covers all formed in the same shape and size and arranged in the same direction in a line along a stacking direction of the battery,
wherein each of the insulating covers openings of both the first and second tubular receiving portions,
wherein each of the insulating covers has a first projection projecting in the stacking direction X of the battery at one side of the stacking direction X of the batteries and one side of a width direction Y of the batteries, and
wherein each of the insulating covers has a second projection projecting in the stacking direction X of the batteries at the other side of the stacking direction X of the batteries and the other side of the width direction Y of the batteries.

* * * * *